United States Patent
Groble et al.

(10) Patent No.: US 12,198,091 B2
(45) Date of Patent: Jan. 14, 2025

(54) REAL-TIME TRAILER UTILIZATION MEASUREMENT

(71) Applicant: SYMBOL TECHNOLOGIES, INC., Lincolnshire, IL (US)

(72) Inventors: Michael E Groble, Lake Zurich, IL (US); Karthik Lakshminarayanan, Wilmington, DE (US); Kevin J O'Connell, Palatine, IL (US); Cuneyt M Taskiran, Chicago, IL (US); Jay J Williams, Glenview, IL (US)

(73) Assignee: Symbol Technologies, LLC, Holtsville, NY (US)

( * ) Notice: Subject to any disclaimer, the term of this patent is extended or adjusted under 35 U.S.C. 154(b) by 406 days.

(21) Appl. No.: 13/919,030

(22) Filed: Jun. 17, 2013

(65) Prior Publication Data

US 2014/0372182 A1 Dec. 18, 2014

(51) Int. Cl.
*G06Q 10/08* (2024.01)
*G01F 17/00* (2006.01)
*G06Q 10/04* (2023.01)

(52) U.S. Cl.
CPC ............. *G06Q 10/08* (2013.01); *G01F 17/00* (2013.01); *G06Q 10/04* (2013.01)

(58) Field of Classification Search
None
See application file for complete search history.

(56) References Cited

U.S. PATENT DOCUMENTS

| | | | |
|---|---|---|---|
| 4,408,782 A | 10/1983 | Condon | |
| 5,265,006 A * | 11/1993 | Asthana | G06Q 10/06 705/7.26 |
| 5,430,831 A | 7/1995 | Snellen | |
| 5,474,083 A | 12/1995 | Church et al. | |
| 6,269,175 B1 | 7/2001 | Hanna et al. | |
| 6,332,098 B2 | 12/2001 | Ross et al. | |
| 6,744,436 B1 | 6/2004 | Chirieleison, Jr. et al. | |

(Continued)

FOREIGN PATENT DOCUMENTS

| | | |
|---|---|---|
| DE | 10050385 A1 | 4/2002 |
| EP | 2178035 A1 | 4/2010 |

(Continued)

OTHER PUBLICATIONS

Australian Patent Office, "Office Action," issued in connection with Australian Patent Application No. 2014281000 on Aug. 11, 2016.

(Continued)

*Primary Examiner* — Eric W Stamber

(57) ABSTRACT

A technique for real-time trailer utilization measurement includes a three-dimensional depth monitor operable to monitor loading of a trailer and a processor operable to determine trailer utilization in real-time during loading of the trailer using image information from the monitor. A graphical user interface can receive utilization information from the processor and display a visual representation of real-time loading of the trailer. Utilization is a ratio of cumulative package volume to currently loaded volume of the trailer, wherein the cumulative package volume is determined from dimensional scans of packages to be loaded in the trailer and the currently loaded volume is determined by the monitor.

20 Claims, 7 Drawing Sheets

(56) References Cited

U.S. PATENT DOCUMENTS

| | | | |
|---|---|---|---|
| 7,455,621 B1 | 11/2008 | Anthony | |
| 7,667,596 B2 | 2/2010 | Ozdemir et al. | |
| 7,773,773 B2 * | 8/2010 | Abercrombie | G06K 9/4633 382/104 |
| 7,961,910 B2 | 6/2011 | Lee et al. | |
| 8,269,616 B2 | 9/2012 | Uehara | |
| 8,346,056 B2 | 1/2013 | M | |
| 9,460,524 B1 | 10/2016 | Curlander | |
| 9,940,730 B2 | 4/2018 | Zhang et al. | |
| 10,185,877 B2 | 1/2019 | Pournaghi et al. | |
| 2002/0150294 A1 | 10/2002 | Cave et al. | |
| 2003/0036935 A1 | 2/2003 | Nel | |
| 2004/0066500 A1 * | 4/2004 | Gokturk | G08B 13/1961 356/4.01 |
| 2004/0125217 A1 * | 7/2004 | Jesson | G06Q 10/087 348/231.3 |
| 2005/0192702 A1 * | 9/2005 | Moutsokapas | B65G 63/004 700/213 |
| 2005/0199782 A1 | 9/2005 | Calver | |
| 2006/0056679 A1 * | 3/2006 | Redert | G06K 9/20 382/154 |
| 2006/0061566 A1 | 3/2006 | Verma et al. | |
| 2006/0239558 A1 | 10/2006 | Rafii et al. | |
| 2007/0016538 A1 | 1/2007 | Bielefeld et al. | |
| 2007/0025593 A1 | 1/2007 | Haupt et al. | |
| 2007/0075853 A1 | 4/2007 | Griffin | |
| 2007/0297560 A1 | 12/2007 | Song | |
| 2008/0025565 A1 * | 1/2008 | Zhang | G06K 9/3241 382/103 |
| 2008/0042865 A1 | 2/2008 | Shephard et al. | |
| 2008/0095404 A1 * | 4/2008 | Abercrombie | G06K 9/4633 382/104 |
| 2008/0201116 A1 * | 8/2008 | Ozdemir | G08B 13/196 703/2 |
| 2008/0204225 A1 | 8/2008 | Kitchen | |
| 2008/0303897 A1 * | 12/2008 | Twitchell, Jr. | B65D 88/121 348/61 |
| 2009/0121017 A1 | 5/2009 | Cato et al. | |
| 2009/0135009 A1 | 5/2009 | Little et al. | |
| 2010/0073476 A1 * | 3/2010 | Liang | G06Q 10/08 348/136 |
| 2010/0110185 A1 * | 5/2010 | Tafazoli Bilandi | H04N 7/183 348/143 |
| 2010/0161170 A1 | 6/2010 | Siris | |
| 2010/0213313 A1 * | 8/2010 | Reed | B64D 9/00 244/118.1 |
| 2010/0268675 A1 | 10/2010 | Baldes et al. | |
| 2010/0287487 A1 * | 11/2010 | Parker | G06F 3/011 715/771 |
| 2011/0106295 A1 | 5/2011 | Miranda et al. | |
| 2011/0264303 A1 * | 10/2011 | Lenser | G05D 1/0038 701/2 |
| 2012/0053785 A1 * | 3/2012 | Wittorf | B60R 25/24 701/36 |
| 2012/0155743 A1 | 6/2012 | Kim | |
| 2012/0163723 A1 | 6/2012 | Balan et al. | |
| 2012/0229646 A1 | 9/2012 | Grandidier et al. | |
| 2012/0243774 A1 | 9/2012 | Chen | |
| 2012/0259509 A1 * | 10/2012 | Wittorf | G06Q 50/28 701/34.4 |
| 2012/0283868 A1 * | 11/2012 | Rutt | G06Q 10/083 700/217 |
| 2013/0136338 A1 | 5/2013 | Asente | |
| 2013/0293539 A1 * | 11/2013 | Hunt | G01B 11/00 345/420 |
| 2013/0342653 A1 * | 12/2013 | McCloskey | G01S 17/026 348/46 |
| 2014/0055446 A1 | 2/2014 | Corral-Soto | |
| 2014/0055560 A1 | 2/2014 | Fu | |
| 2014/0118716 A1 | 5/2014 | Kaganovich | |
| 2014/0123606 A1 * | 5/2014 | Ehrat | B65B 5/105 53/473 |
| 2014/0247261 A1 * | 9/2014 | Lenser | G05D 1/0038 345/419 |
| 2014/0350719 A1 * | 11/2014 | Fleischmann | B65G 43/08 700/230 |
| 2014/0372182 A1 | 12/2014 | Groble et al. | |
| 2014/0372183 A1 | 12/2014 | Groble et al. | |
| 2015/0042767 A1 | 2/2015 | Ciurea et al. | |
| 2015/0170256 A1 | 6/2015 | Pettyjohn | |
| 2015/0248765 A1 | 9/2015 | Criminisi et al. | |
| 2015/0332075 A1 | 11/2015 | Burch | |
| 2016/0238374 A1 | 8/2016 | Burch et al. | |
| 2016/0238425 A1 | 8/2016 | Burch et al. | |
| 2016/0239790 A1 | 8/2016 | Burch et al. | |
| 2016/0239791 A1 | 8/2016 | Burch et al. | |
| 2016/0239792 A1 | 8/2016 | Burch et al. | |
| 2016/0239795 A1 | 8/2016 | Burch et al. | |
| 2016/0239799 A1 | 8/2016 | Burch et al. | |
| 2016/0239801 A1 | 8/2016 | Burch et al. | |
| 2016/0239802 A1 | 8/2016 | Burch et al. | |
| 2017/0140550 A1 | 5/2017 | Zhang et al. | |
| 2017/0178333 A1 | 6/2017 | Zhang et al. | |
| 2017/0236296 A1 | 8/2017 | Breedvelt-Schouten et al. | |

FOREIGN PATENT DOCUMENTS

| | | | |
|---|---|---|---|
| EP | 2302564 A1 | 3/2011 | |
| GB | 1010162 A | 11/1965 | |

OTHER PUBLICATIONS

Canadian Patent Office, "Office Action," issued in connection with Canadian Patent Application No. 2914800 on Aug. 25, 2016.

Simulate point clouds of packages loaded in trailers: http://bl.ocks.org.michael-groble/4588547, Jan. 21, 2013.

Office Action for Mexican Patent Application No. MX/a/2015/017308 mailed Feb. 1, 2017.

Office Action for Canadian Patent Application No. 2914800 mailed Mar. 9, 2017.

Zhang et al., U.S. Appl. No. 14/978,367, filed Dec. 22, 2015.

Extended Search Report for European Patent Application No. 14737390.6 mailed on Oct. 24, 2017.

* cited by examiner

REAL-TIME TRAILER UTILIZATION MEASUREMENT

BACKGROUND

A crucial aspect for Transportation & Logistics customers is the efficient loading of individual packages on trailers at their distribution facilities. It is desired that the loading be done quickly, safely and with as little wasted trailer space as possible. At present, an average utilization of 70% of trailer space seems to be the industry norm, leaving significant room for improvement.

Current solutions to determine loading efficiency only provide a measure of trailer space utilization at the end of the loading process. For example, prior art package routing and trailer loading systems provide a means for identifying which packages have been loaded into which trailer and aggregating characteristics of the packages within a trailer (e.g. total volume and weight). These systems provide a means of tracking trailer load performance (overall fullness of the trailer and space utilization efficiency), but only at the completion of a load, when real-time corrective action or feedback is not possible.

These solutions cannot be used for purposes of improving utilization while the trailer is being loaded. In particular, these solutions do not provide volume or depth information as the trailer is loaded. In addition, these solutions do not account for loading different trailer sections. Further, these solutions do not provide any means of visualizing the utilization profile for a trailer or means for sending alerts based on utilization goals.

Accordingly, there is a need for a technique to determine utilization during a trailer loading procedure so that the utilization can be tracked and improved in real-time.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
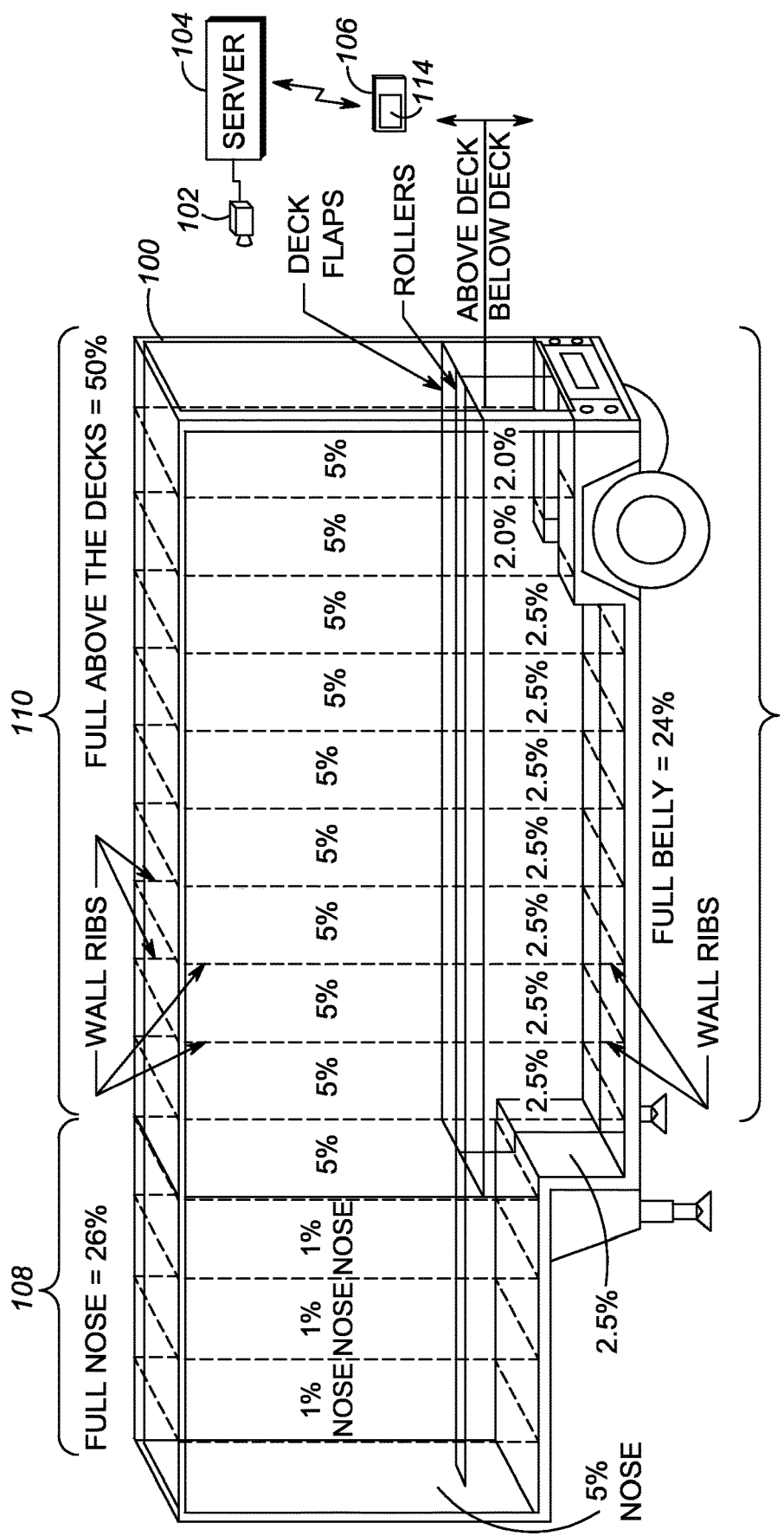
FIG. 1 is a simplified perspective view of a system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An apparatus and method is described that provides a technique to determine utilization during a trailer loading procedure so that the utilization can be tracked, reported, and improved in real-time. The present invention integrates routing information with volumetric measurements of the trailers to give trailer loaders and their supervisors visibility into load efficiency in real-time while the trailer is being loaded so actual loader performance can be compared to goals and corrective action taken to improve efficiency before the completion of the load.

FIG. 1 is a simplified perspective view of a system, in accordance with some embodiments of the present invention. The present invention includes a monitor 102 to image the loading of the trailer. The monitor can comprise a video camera device, such as a RGB camera, as is known in the art, and any type of three dimensional depth/volume monitor, such as a stereo, structured light or time-of-flight depth camera, an infrared three dimensional depth/volume camera, and the like able to determine a distance to the points (i.e. pixels) in an image.

The monitor 102 is coupled to a server or processor 104 and is operable to transfer imaging information about trailer loading to the processor. The monitor may transfer the imaging information to the processor using wired (shown) or wireless (not shown) communication, such as a wireless local area network for example. The processor 104 can also provide wireless (shown) or wired (not shown) communication with mobile or fixed-location terminals 106 within the network for purposes of conveying information via a user interface 114 of the terminal or providing instructions to a loader using the terminal about how that person is loading the trailer. The user interface can provide an audible alert or a distinct vibration pattern for a worn device, or the user interface can be a graphical display or textual device. The protocols and messaging needed to establish wireless communications are known in the art and will not be presented here for the sake of brevity.

The processor 104 can determine trailer utilization in real-time during loading of the trailer using image information from the monitor 102 and existing package scanning equipment. The processor can process this image information to determine utilization of the trailer loading and send this utilization information to the graphical user interface 114 of the terminal 106 to display a visual representation of real-time loading of the trailer. The visual representation can be provided on a terminal which can comprise a mobile device, a leaderboard or dashboard, a service kiosk, or a device that is wearable by a loader.

Various entities adapted to support the inventive concepts of the embodiments of the present invention. Those skilled in the art will recognize that the figures do not depict all of the equipment necessary for network to operate but only those components and logical entities particularly relevant to the description of embodiments herein. For example, servers, imaging devices, and communication terminals can all includes separate processors, communication interfaces, transceivers, memories, displays, optical devices, etc. In general, components such as processors, communication devices, displays, and optical devices are well-known. For example, processing units are known to comprise basic components such as, but not limited to, microprocessors, microcontrollers, digital signal processors, memory cache, application-specific integrated circuits, and/or logic circuitry. Such components are typically adapted to implement algorithms and/or protocols that have been expressed using high-level design languages or descriptions, expressed using computer instructions, or expressed using messaging logic flow diagrams.

Thus, given an algorithm, a logic flow, and/or a messaging/signaling flow, those skilled in the art are aware of the many design and development techniques available to implement a processor that performs the given logic. Therefore, the entities shown represent a known system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the image processing and control aspects of the present invention may be implemented in any of the devices listed above or distributed across such components. It is within the contemplation of the invention that the operating requirements of the present invention can be implemented in software in conjunction with firmware or hardware.

Specifically, the system described herein combines package loading information with a trailer load monitor to compute a real-time measurement of trailer utilization, i.e. how well the trailer is loaded. The system can also accommodate trailers with multiple sections (such as shown in FIG. 1), some of which may not be directly sensed by the monitor. The present invention works whether the trailer monitor provides depth or volume information. The monitor can be stationary or mobile, as long as the image measurements can be referenced to the trailer coordinate system.

The present invention maintains a model of the state of the packages and the trailer. This includes maintaining a package model, which describes a correlation between the unique package ID that is scanned before the package is loaded and the packages' attributes such as length, width and height (or equivalently volume), and weight. The present invention also maintains a trailer dimension model, which describes a trailer type, its dimensions, and utilization goals, i.e. how well that trailer should be loaded. Trailers may have multiple sections as shown in FIG. 1 (i.e. four sections in this case, left and right belly sections 112, a nose section 108, and a main section 110). The utilization goals may be different in each section. The goals may also be different for different trailer models, loading facilities, teams, or individual loaders.

During sorting and before loading, each package is passed through a dimensioning scan, which scans the package dimensions (and weight), whereupon the system updates the package model. Upon loading, each package passes through a loading scan, where the system correlates the package with its volume from the dimensions of the package model to determine the cumulative package volume, $V_{packages}$, within the trailer. The system also correlates the package load time with the filled trailer space, $V_{loaded}$, at that time. The system calculates the instantaneous trailer utilization, U, as the ratio of cumulative package volume to currently loaded volume, $U = V_{packages}/V_{loaded}$.

Figure 2:
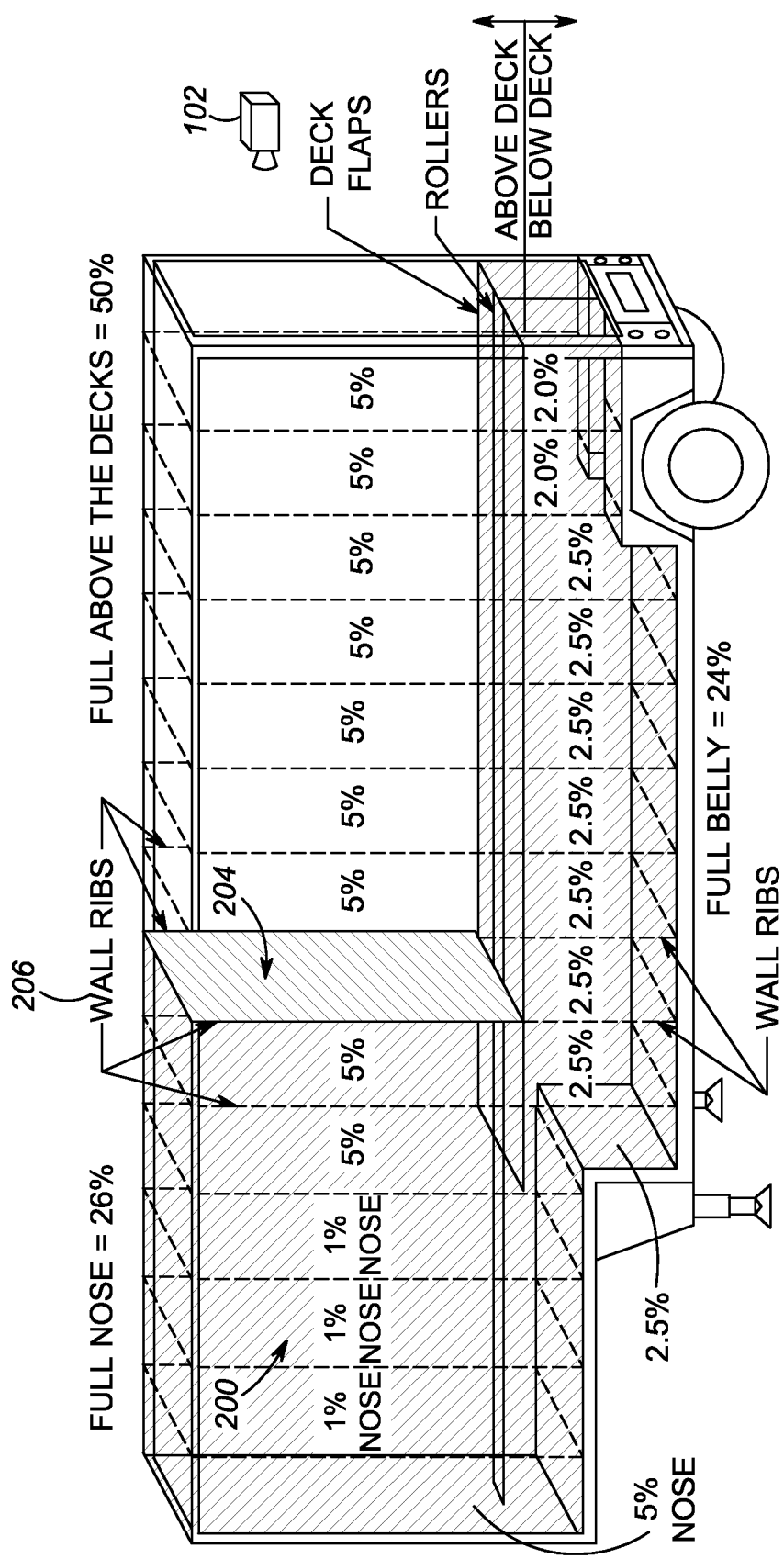
FIG. 2 is a simplified perspective view of the system of FIG. 1 during loading of the trailer.
Figure 3:
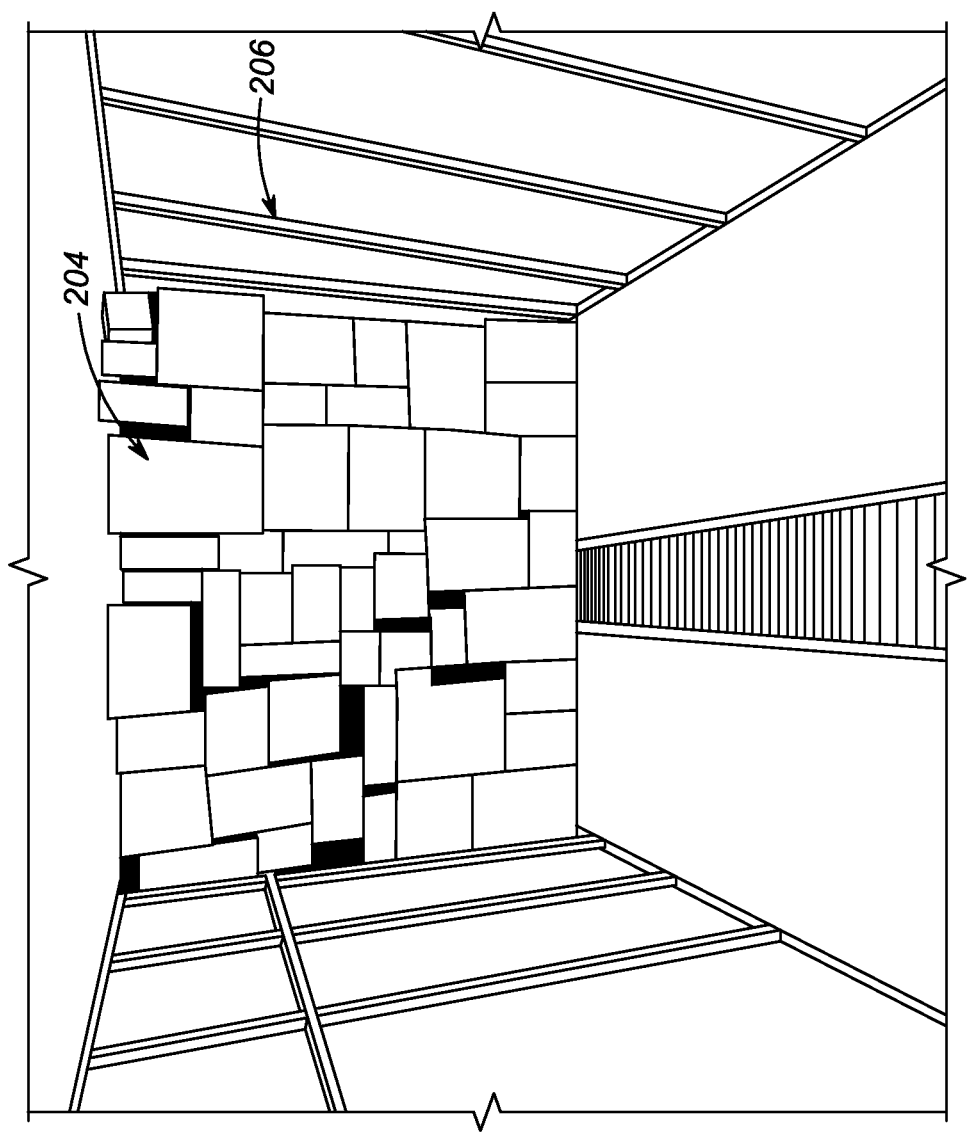
FIG. 3 is a simplified rear view of FIG. 2.
Figure 4:
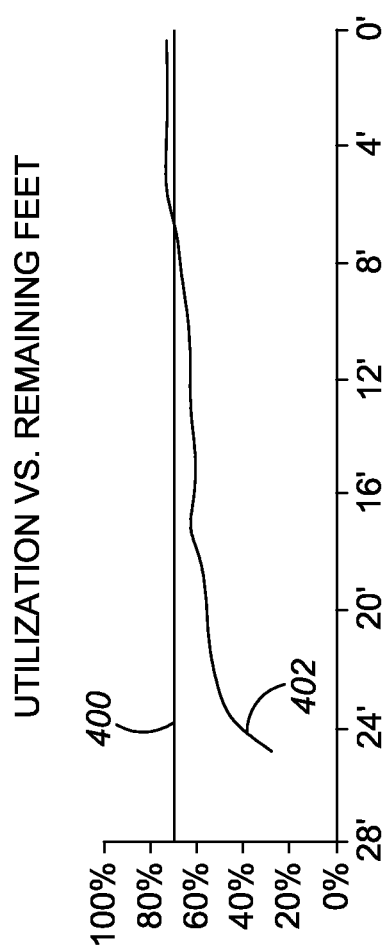
FIG. 4 is a graphical representation displaying utilization measurements during loading of the trailer, in accordance with some embodiments of the present invention.

The system generates a real-time visualization of the utilization for loaders and supervisors, an example is shown in FIG. 2. For example, the monitor is able to determine a depth to the latest filled "wall" 204 of the loading. This wall 204 is also show from a rear view in FIG. 3 as seen from the perspective of the monitor. Knowing the trailer dimensional model and the depth of the wall 204, the processor is able to determine the filled volume 200 of the trailer, $V_{loaded}$. Given the volume of the packages that were pre-scanned for their dimensions, and having been scanned as loaded gives the volume of packages, $V_{packages}$, that have already been loaded, whereupon the instantaneous trailer utilization, $U = V_{packages}/V_{loaded}$, can be determined, as represented in FIG. 4 where the instantaneous utilization 402 is plotted versus fullness of the trailer (i.e. the remaining feet to be filled. As can be seen, at point of 20' from the back of the trailer, loaders can see early that they are behind goal and can adjust to improve utilization before the trailer is finished loading at 0'. Optionally, an alert can be generated for a system administrator or loader when the measured utilization 402 does not reach a target utilization 400.

The direct measurement of utilization above is for the case of a trailer where the monitor can view the entire contents, e.g. for a trailer having no sections hidden from view of the monitor. There are two ways to handle hidden sections, where portions of the trailer that are not observable by the monitor, based on the type of information reported by the trailer monitor. If the monitor reports a three dimensional volumetric representation such as a point cloud or geometric model, the individual loaded section volumes $V_{loaded}^s$ can be computed by intersecting the three dimensional representation with the section volume from the trailer dimension model. As defined herein, a point cloud defines each "pixel" of an image having three-dimensional coordinates. For example, an RGB value from a camera image has an x,y,z location for each pixel. The "point cloud" is that collection of x,y,z location "pixels" detected by the monitor, allowing the recreation of the three-dimensional environment of the trailer.

The package section volumes $V_{package}^s$ can be computed by correlating package scan times with loaded section volume changes. For example, as packages are dimensionally scanned before loading, these package must take up a certain volume when loaded in a section. In other words, the change in loaded section volumes $$\Delta V_{loaded}^s = V_{loaded}^s(t+\Delta t) - V_{loaded}^s(t)$$

allows us to compute the ratio of loaded volume change in each section $$R^s = \Delta V_{loaded}^s \Big/ \sum_{s \in S} \Delta V_{loaded}^s$$

and use those ratios to allocate packages loaded during that interval to likely sections.

$$\Delta V_{package}^s = R^s(V_{package}(t+\Delta t) - V_{package}(t))$$

Figure 5:
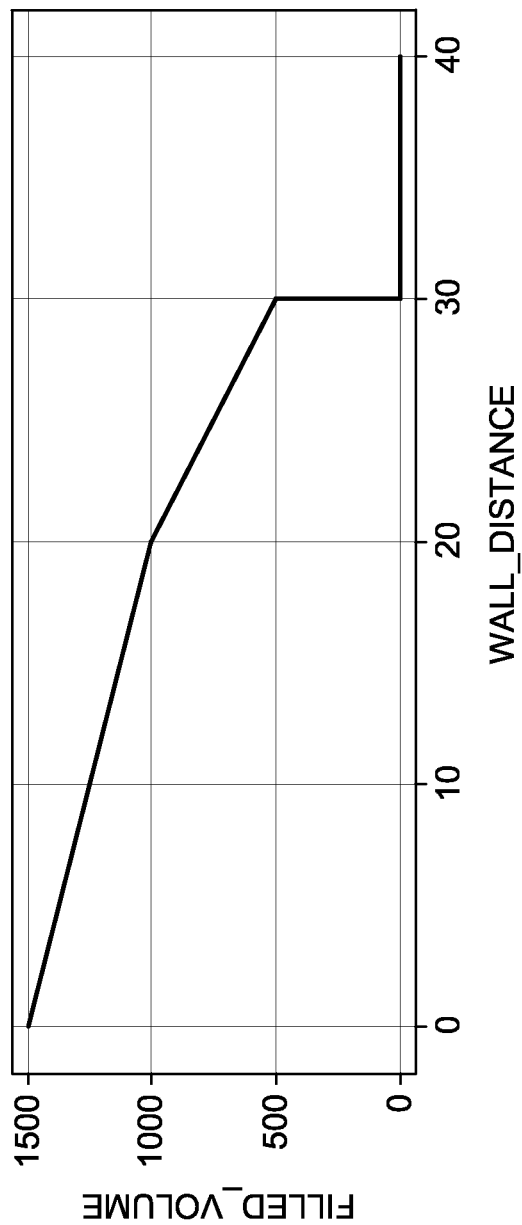
FIG. 5 is a graphical representation displaying estimated loading volumes for invisible sections of the trailer, in accordance with some embodiments of the present invention.

In the case that the trailer monitor reports a single depth measurement, instead of a volume measurement, the sections are divided linearly along the depth-sensing axis. Those sections that are not along the axis (such as the belly), or are beyond the range of the depth monitor, may be lumped into an "invisible" section. In this case, the loaded volumes are computed as in FIG. 5. Beyond the trailer end, or monitor range (e.g. 30 feet), the "invisible" volume is not counted.

But once the wall depth changes within monitor range, the "invisible" areas are assumed to be full. For example, once the monitor starts "seeing" a wall of packages at 30 feet, it can be assumed that the 500 cu. ft. belly of the trailer has been filled. The different cross-sectional areas of different sections lead to different slopes in the volume profile. For example, the nose of the trailer has a different cross sectional area than the main section leading to a different slope of volume change with distance in the 20-30' range.

The package section volumes $V_{package}{}^s$ can be computed as the sum of the individual package volumes that are loaded between section transition times. For example, from FIG. 5, there is an invisible section (e.g. a belly section), a 10' long nose section at the back of a 30' trailer and a 20' long main section. The package volume of the belly would be the volume of those packages scanned and loaded before the distance decreased below 30'. The package volume of the nose section would be the sum from the packages loaded between the wall distances of 30' and 20', and so on.

Figure 6:
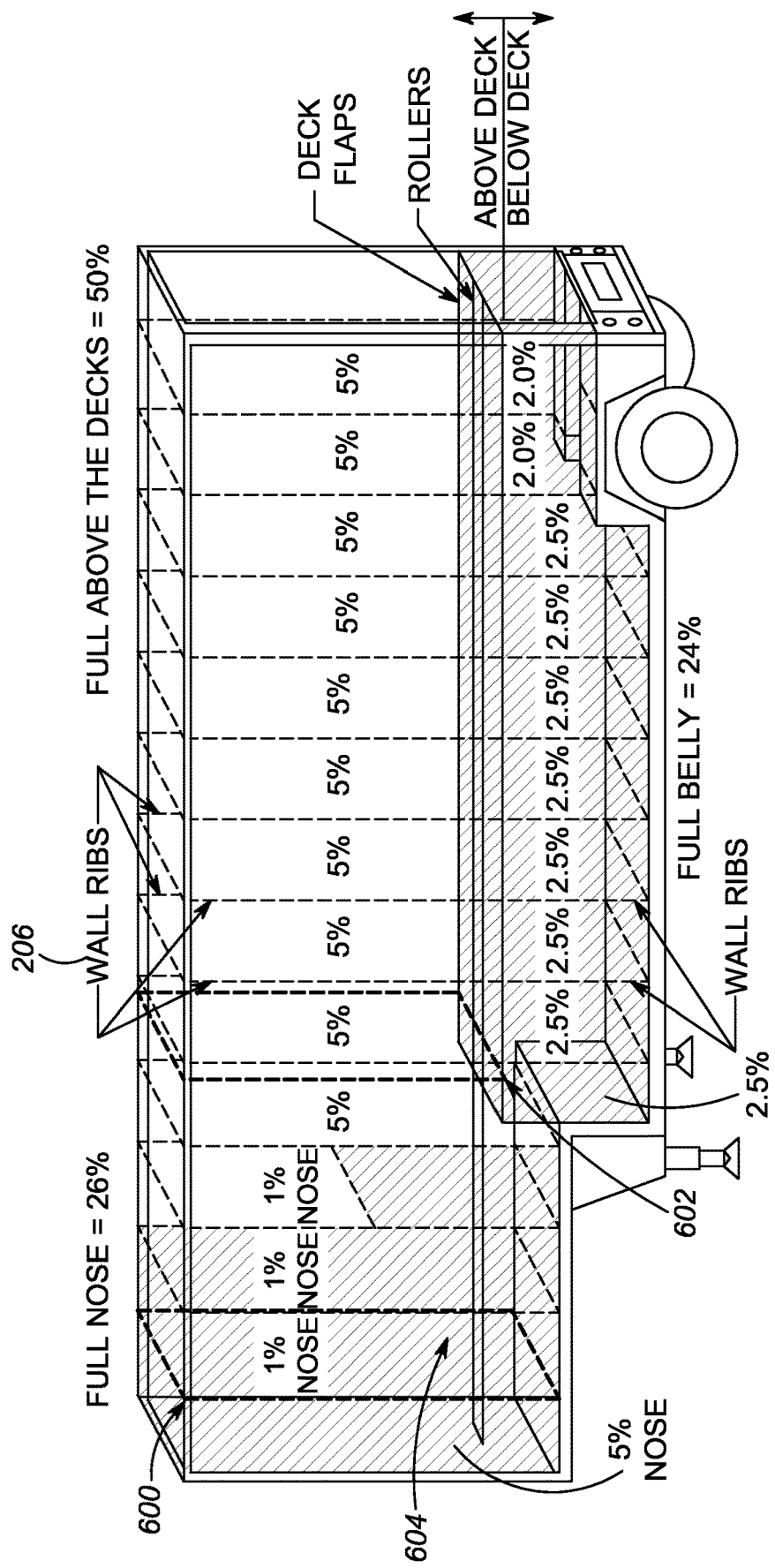
FIG. 6 is a graphical representation displaying trailer utilization measurement, in accordance with another embodiment of the present invention.

In the absence of depth information, the system can generate a graphical representation of the target trailer fullness given the actual package volume scanned and target utilization for each section as shown in FIG. 6. This is particularly useful for sections that are not completely visible by the trailer monitor. Without depth, the goal loaded volume (package volume/target utilization) can be displayed in a diagram on a user interface as shown. Loaders compare the shaded area 604 to the current wall location to know if they are ahead or behind goal. For example, a real wall of packages at position 600 means the loader is ahead of goal, where packages are using less space than the target utilization. However, having the wall of packages at position 602 means the loader is behind the goal. Ribs 206 and other visual landmarks within the trailer make this relatively an easy task to perform. For example, a loader can count the number of ribs from the wall of packages to the back of the trailer to determine where the loader is in the loading process.

Figure 7:
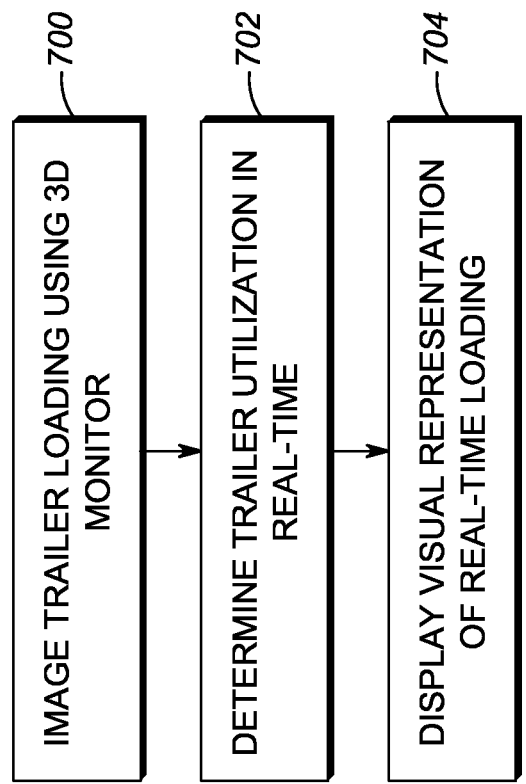
FIG. 7 is a simplified flow chart of a method, in accordance with some embodiments of the present invention.

FIG. 7 illustrates a flowchart of a method for real-time trailer utilization measurement, in accordance with the present invention. The method includes a first step 700 of imaging loading of a trailer using a three-dimensional monitor. The monitor can be a three-dimensional depth/volume camera operable to provide a fill distance to determine a loaded volume of the trailer. Optionally, the monitor includes a video camera operable to provide an optical image that is merged with the fill distance to provide an image of fill depth used by the processor to determine trailer utilization in the determining step.

A next step 702 includes determining trailer utilization in real-time during loading of the trailer using image information from the three-dimensional monitor and package information (e.g. volume from dimension scans) for packages loaded in the trailer. This can include establishing utilization as a ratio of cumulative package volume to currently loaded volume of the trailer, wherein the cumulative package volume is determined from dimensional scans of packages to be loaded in the trailer and the currently loaded volume is determined by the monitor. This step can also include estimating utilization for any portions of the trailer that are not observable by the scanner. In particular, a package section volume of a hidden section can be computed by correlating package scan times with changes in loaded section volume. Alternatively, a package section volume can be computed as the sum of the individual package volumes that are loaded between section transition times. This step can also include calculating a speed at which the trailer is being loaded.

A next step 704 includes conveying or displaying, via a user interface, a representation of real-time loading of the trailer using received utilization information. Optionally, this step can include generating an alert when a determined utilization falls below a target threshold.

Advantageously, the apparatus and method described herein introduces a depth/volume monitor to compute the efficiency incrementally in real-time as the trailer is being loaded. Specifically, the present invention combines package loading information with trailer load monitors to compute a real-time measurement of trailer utilization and accommodating trailers with multiple sections, some of which may not be directly sensed by the trailer monitor. The present invention works whether the trailer monitors provide depth or volume information and still provides useful information in absence of a trailer monitor. The monitors may also be stationary or mobile, as long as the measurements can be referenced to the trailer coordinate system.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for real-time utilization measurement, the system comprising:
    a depth sensor configured to determine a distance from the depth sensor to a wall of packages loaded in a space;
    a processor in communication with the depth sensor, the processor configured to:
    determine a currently loaded volume using the distance from the depth sensor to the wall of packages;
    determine a cumulative package volume from dimensional scans of packages to be loaded in the space; and
    generate a value of a utilization metric in real-time during loading of the space by calculating a ratio of the currently loaded volume and the cumulative package volume; and
    a user interface configured to convey a representation of real-time loading of the space based on the value of the utilization metric.

2. The system of claim 1, further comprising a video camera configured to provide an image, wherein the processor is configured to:
    merge the image with the distance to provide an image of fill depth; and
    generate the value of the utilization metric using the image of fill depth.

3. The system of claim 1, wherein the processor is configured to generate an alert when the value of the utilization metric falls below a target utilization.

4. The system of claim 1, wherein the processor is configured to estimate utilization for a portion of the space not observable by the depth sensor.

5. The system of claim 4, wherein the processor is configured to estimate the utilization for the portion of the space not observable by the depth sensor by detecting a change in the distance to the wall of packages and assuming that the portion is filled based on the detected change in the distance.

6. The system of claim 1, wherein the processor is configured to compute a package section volume by correlating package scan times with changes in loaded section volume.

7. The system of claim 1, wherein the processor is configured to compute a package section volume as a sum of individual package volumes that are loaded between section transition times.

8. The system of claim 1, wherein the processor is configured to calculate a speed at which the space is being filled based on the value of the utilization metric.

9. The system of claim 1, wherein the depth sensor is mounted proximate an opening of the space.

10. The system of claim 1, wherein the space is defined by a trailer.

11. The system of claim 1, wherein the processor is configured to generate a visualization of the value of the utilization metric in relation to a remaining distance in the space to be filled.

12. A method for real-time utilization measurement, the method comprising:
    generating, via hardware including a depth sensor, a distance from the depth sensor to a wall of packages loaded in a space;
    determining, via a logic circuit, a currently loaded volume using the distance from the depth sensor to the wall of packages;
    determining, via the logic circuit, a cumulative package volume from dimensional scans of packages to be loaded in the space;
    generating a value of a utilization metric in real-time during loading of the space by calculating a ratio of the currently loaded volume and the cumulative package volume; and
    conveying, on a user interface, a representation of real-time loading of the space based on the value of the utilization metric.

13. The method of claim 12, further comprising merging an image generated by a camera with the distance to provide an image of fill depth.

14. The method of claim 12, further comprising generating an alert when the value of the utilization metric falls below a target threshold.

15. The method of claim 12, wherein the determining of the value includes estimating utilization for any portions of the space not observable by the depth sensor.

16. The method of claim 12, wherein the determining of the value includes computing a package section volume by correlating package scan times with changes in loaded section volume.

17. The method of claim 12, wherein the determining of the value includes computing a package section volume as a sum of individual package volumes that are loaded between section transition times.

18. The method of claim 12, further comprising calculating a speed at which the space is being loaded based on the value of the utilization metric.

19. The method of claim 12, wherein the space is defined by a trailer.

20. The method of claim 12, further comprising generating a visualization of the value of the utilization metric in relation to a remaining distance in the space to be filled.

* * * * *